(12) United States Patent
Yi

(10) Patent No.: US 12,472,536 B2
(45) Date of Patent: Nov. 18, 2025

(54) DRAIN CLEANERS

(71) Applicant: Chong Song Yi, Mohegan Lake, NY (US)

(72) Inventor: Chong Song Yi, Mohegan Lake, NY (US)

(*) Notice: Subject to any disclaimer, the term of this patent is extended or adjusted under 35 U.S.C. 154(b) by 0 days.

(21) Appl. No.: 18/810,297

(22) Filed: Aug. 20, 2024

(65) Prior Publication Data

US 2024/0408654 A1 Dec. 12, 2024

Related U.S. Application Data

(63) Continuation of application No. PCT/US2023/036947, filed on Nov. 7, 2023.

(60) Provisional application No. 63/438,176, filed on Jan. 10, 2023.

(51) Int. Cl.
*B08B 9/045* (2006.01)
*E03C 1/302* (2006.01)

(52) U.S. Cl.
CPC .............. *B08B 9/045* (2013.01); *E03C 1/302* (2013.01); *B08B 2209/04* (2013.01)

(58) Field of Classification Search
CPC ..... B08B 9/043; B08B 9/045; B08B 2209/04; E03C 1/302; E03F 9/005
USPC ........................ 15/104.095, 104.33
See application file for complete search history.

(56) References Cited

U.S. PATENT DOCUMENTS

| | | | | |
|---|---|---|---|---|
| 2,033,670 A * | 3/1936 | Auer | ........................ | H02G 1/08 |
| | | | | 279/37 |
| 2,769,191 A * | 11/1956 | Hunt | ........................ | E03F 9/005 |
| | | | | 279/51 |
| 3,449,782 A * | 6/1969 | Hunt | ........................ | E03F 9/005 |
| | | | | 279/74 |
| 4,361,924 A * | 12/1982 | Irwin | ........................ | E03F 9/005 |
| | | | | 279/46.2 |
| 4,819,292 A * | 4/1989 | Kerr | ........................ | E03F 9/005 |
| | | | | 15/104.33 |
| 11,021,859 B2 * | 6/2021 | Reed | ........................ | E03F 9/005 |
| 2010/0294378 A1 | 11/2010 | Kleimann, Sr. | | |
| 2020/0080293 A1 | 3/2020 | Krohlow | | |
| 2022/0298775 A1 | 9/2022 | Heimann | | |

FOREIGN PATENT DOCUMENTS

| | | | |
|---|---|---|---|
| JP | 2007-70111 A | | 3/2007 |
| KR | 20060105395 A | * | 10/2006 |
| KR | 20140062800 A | * | 5/2014 |

OTHER PUBLICATIONS

International Search Report dated Apr. 9, 2024 for PCT International Application No. PCT/US2023/036947 (Form PCT/ISA/210).

(Continued)

*Primary Examiner* — Monica S Carter
*Assistant Examiner* — Jonathan R Zaworski
(74) *Attorney, Agent, or Firm* — Birch, Stewart, Kolasch & Birch, LLP

(57) ABSTRACT

Discussed is a drain cleaner including a body having a first section and a second section, wherein the first section includes a lower part connected to a lower handle and an upper part connected to an upper handle, and wherein the upper part is configured to move relative to the lower part based on a movement of the upper handle with respect to the lower handle when the upper and lower handles are squeezed together by a user.

19 Claims, 18 Drawing Sheets

(56) References Cited

OTHER PUBLICATIONS

Written Opinion of the International Searching Authority dated Apr. 9, 2024 for PCT International Application No. PCT/US2023/036947 (Form PCT/ISA/237).

* cited by examiner

DRAIN CLEANERS

CROSS REFERENCE TO RELATED APPLICATION

This application is a By-pass Continuation of PCT International Application No. PCT/US2023/036947, filed on Nov. 7, 2023, which claims priority to U.S. Provisional Application No. 63/438,176, filed on Jan. 10, 2023, the entire contents of all these applications being hereby expressly incorporated by reference into the present application.

BACKGROUND

Field

Embodiments of the invention are directed to a hand held drain cleaner that can be used to clean a drain to improve drain flow.

Discussion of the Related Art

Drain cleaners are typically designed to clean portions of a drain. Drain cleaners usually have a flexible cable attached to a handheld drain auger, pushed into the drain while the user rotates a drum that anchors the flexible cable. Similar to the handheld drain augers, drain rods can be used for clearing blockages in long, straight runs of pipe.

Many handheld drain augers have flexible cables which are thin enough to pass through common sink traps, and advantages of handheld drain augers include low relative cost and ready availability of these tools in hardware stores. However, conventional handheld drain augers are not effective at allowing a strong pushing force or pulling force to be applied to the flexible cable, so that power to clear blockages are insufficient. Further, even when a drill is used to rotate the flexible cable directly, the user pushing the drill in an axial direction to the flexible cable may not generate enough force to provide the strong pushing force or pulling force to the flexible cable.

SUMMARY OF THE DISCLOSURE

One aspect of the invention is to provide a hand held drain cleaner capable of providing a strong pushing force or pulling force to be applied to a cable or a shaft by enabling a user to push or pull with both hands at two locations of the hand held drain cleaner that are spaced apart.

A drain cleaner according to an embodiment of the invention can include a body having a first section and a second section, the first section includes a lower part connected to a lower handle and an upper part connected to an upper handle, and the upper part is configured to move relative to the lower part based on a movement of the upper handle with respect to the lower handle when the upper and lower handles are squeezed together by a user.

A drain cleaner according to another embodiment of the invention can include a body having a first section and a second section connected to the first section; a first rotating member rotatably disposed in an interior of the first section; a collet rotatably disposed in an interior of the first section, and configured to grab a shaft that penetrates through the first section; a second rotating member rotatably disposed in an interior of the second section, and communicating with the first rotating member; and a handle part connected to the first section, and configured to enable a user to hold the handle part.

The first section can include: an upper part; a first upper housing adjacent to the upper part; a first lower housing; and a lower part interposed between the first upper housing and the first lower housing and coupled to the first upper housing and the first lower housing, the handle part can include: an upper handle connected to the upper part; and a lower handle connected to at least one of the lower part and the first lower housing.

The upper part can be connected to the upper housing by a hinge to pivot relative to the upper housing.

The upper part can include an upper slot, the lower part includes a lower slot, and a rod is connected to the collet and penetrates through the upper slot and the lower slot to slidably move in the upper slot and the lower slot based on a movement of the upper handle.

The collet can include: a collet body; and a collet head connected to the collet body, and a hole extending through the collet body and the collet head to accommodate the shaft.

The collet head can include a first end distal from the collet body and a second end proximal to the collet body, and the collet head in the shape of a truncated cone.

The collet head can further include cuts extending in an axial direction of the hole.

The cuts can include a plurality of primary cuts extending along the collet head, and a plurality of secondary cuts extending between the plurality of primary cuts.

The first rotating member can include a hole having an inner wall, and the collet head is configured to be inserted into the hole of the first rotating member so that the first rotating member and the collet head rotate together when the handle part is squeezed by the user.

An urging device can be interposed between the first rotating member and the collet body to push on the collet body.

The collet body can include: a collet notch; and a rod connected to the collet notch to enable the collet to engage the first rotating member.

The first rotating member can include: a first bearing connected to the first section; a first rotating gear connected to the first bearing; and a first center hole, and the first bearing, the first rotating gear and the first center hole are aligned in an axial direction.

The second section can include: a second upper housing; and a second lower housing coupled to the second upper housing, and the second upper housing and the second lower housing defines the interior of the second section.

The second rotating member can include: a second bearing connected to the second lower housing; a second rotating gear connected to the second bearing; and a center shaft connected to the second bearing and the second rotating gear, and the center shaft, the second bearing and the second rotating gear are aligned in an axial direction.

A first rotation axis of the first rotating member and a second rotation axis of the second rotating member can be one of parallel or angled to each other.

The handle part can include: an upper handle connected to the upper part; and a lower handle connected to at least one of the lower part and the first lower housing, and the upper handle is straight or curved.

The drain cleaner can be configured to enable the user to hold the handle part using a first hand and a drill connected to the second rotating member using a second hand, and enable the user to push the drain cleaner away from the user or pull the drain cleaner towards the user.

A drain cleaner according to another embodiment of the invention can include a first section accommodating a first rotating member and a collet configured to rotate with the first rotating member when engaged to the first rotating member; a second section connected to the first section and accommodating a second rotating member configured to engage a drill, a rotation of the drill rotates the second rotating member, the first rotating member, and the collet.

A shaft extending through the first section can be provided, and configured to rotate based on the rotation of the drill.

The rotating cable and the flexible shaft are not held by the user. The user instead holds the cable holder or the cleaner. This allows for the rotating cable to enter the drain with greater force. The flexible shaft allows the cable to rotate without loss of torque.

The cable can be rotated at the speed of the hand drill. The rotating cable can be moved up or down the drain. These movements allow for clearing blocked drains or cleaning drains. The length of the flexible shaft or the rotating cable can be adjusted by holding and releasing the flexible shaft. This product is compact and light, and is easy for the user to maneuver.

DETAILED DESCRIPTION OF THE EMBODIMENTS

This product uses a drain cleaner, such as a hand held drain cleaner using a collet to move a rotating cable affixed to a flexible shaft. The user's hand controls the up and down movement of the rotating cable. A hand drill rotates the cable.

The rotating cable and the flexible shaft are not held by the user. The user instead holds the cable holder or the cleaner. This allows for the rotating cable to enter the drain with greater force and allows the user to feel resistance when cleaning or clearing a blockage in the drain.

The flexible shaft allows the cable to rotate without loss of torque.

The cable can be rotated at the speed of the hand drill. The rotating cable can be moved up or down the drain. These movements allow for clearing blocked drains or cleaning drains.

The length of the flexible shaft or the rotating cable can be adjusted by holding and releasing the flexible shaft.

This product is compact and light, and is easy for the user to maneuver.

As shown in FIGS. 1-18, for example, provided is a hand held drain cleaner that can be used to clean a drain, for example, when blocked or to improve drain flow.

Figure 1:
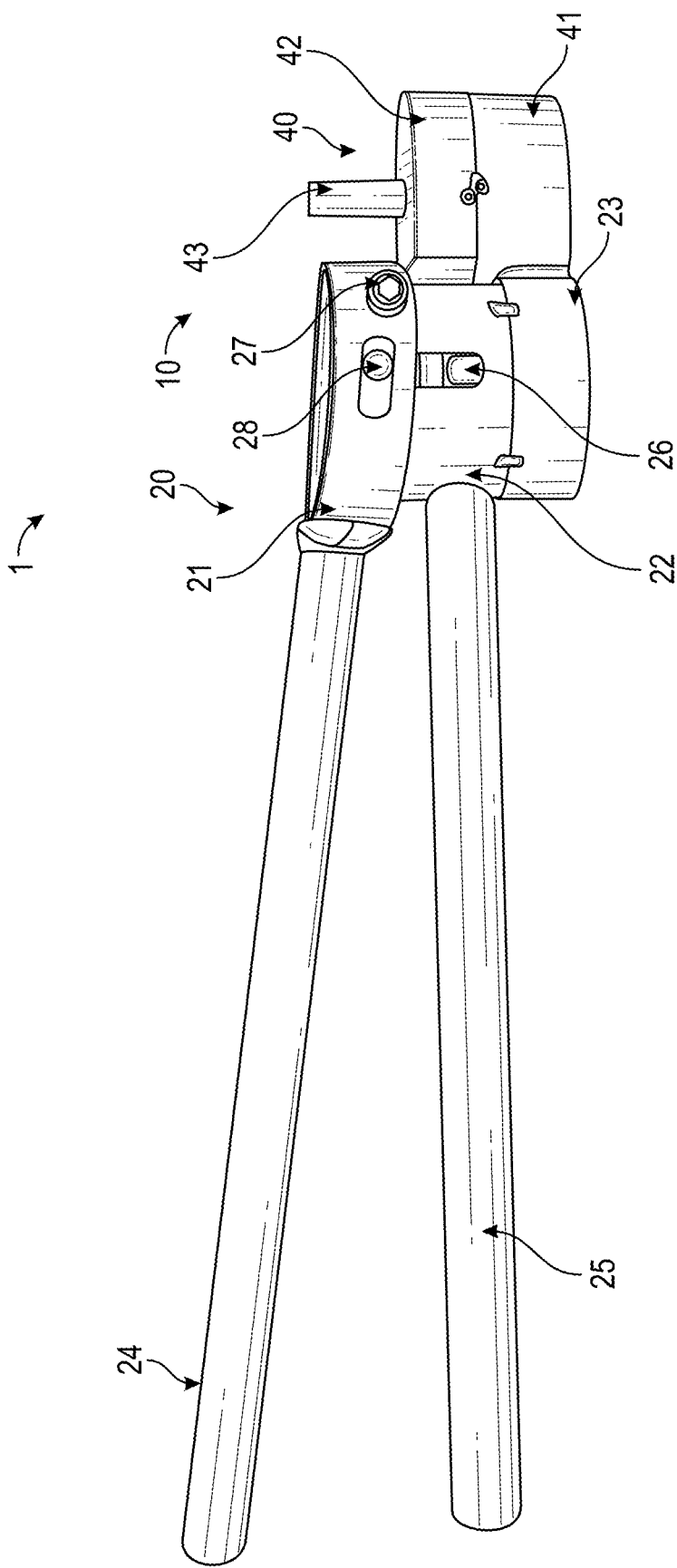
FIG. 1 is an elevation view of an embodiment of the invention.
Figure 2:
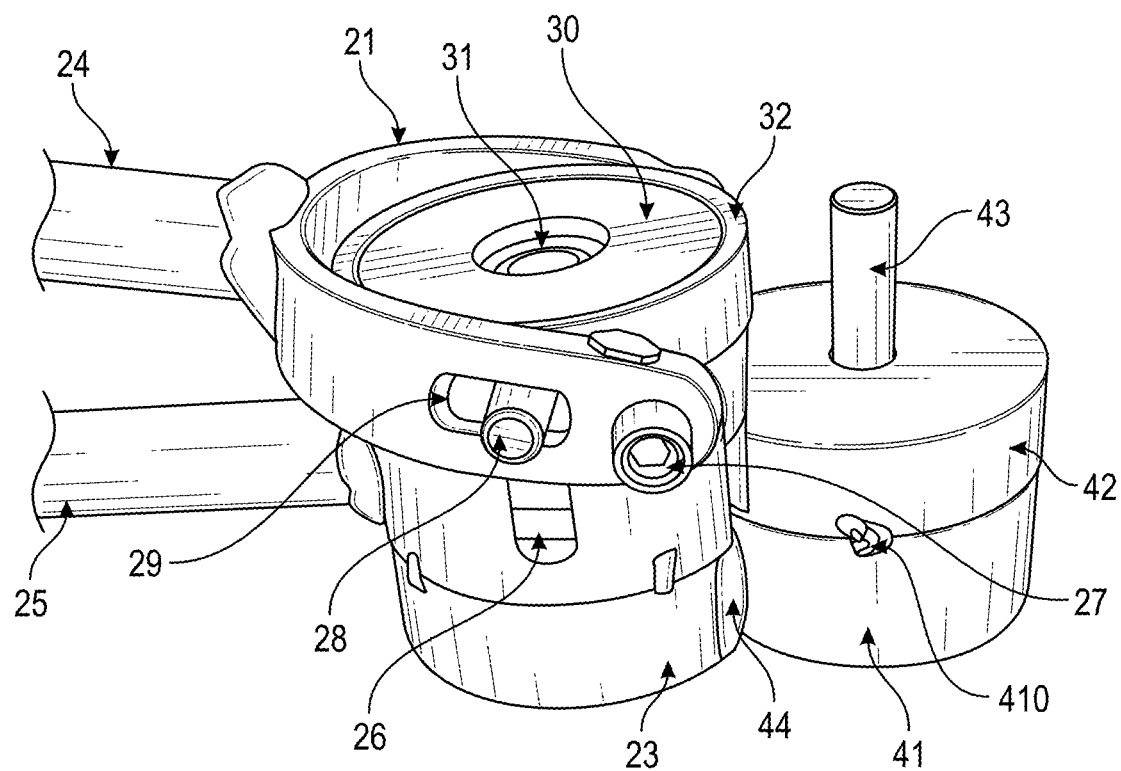
FIG. 2 is an upper perspective view of the embodiment of the invention.
Figure 3:
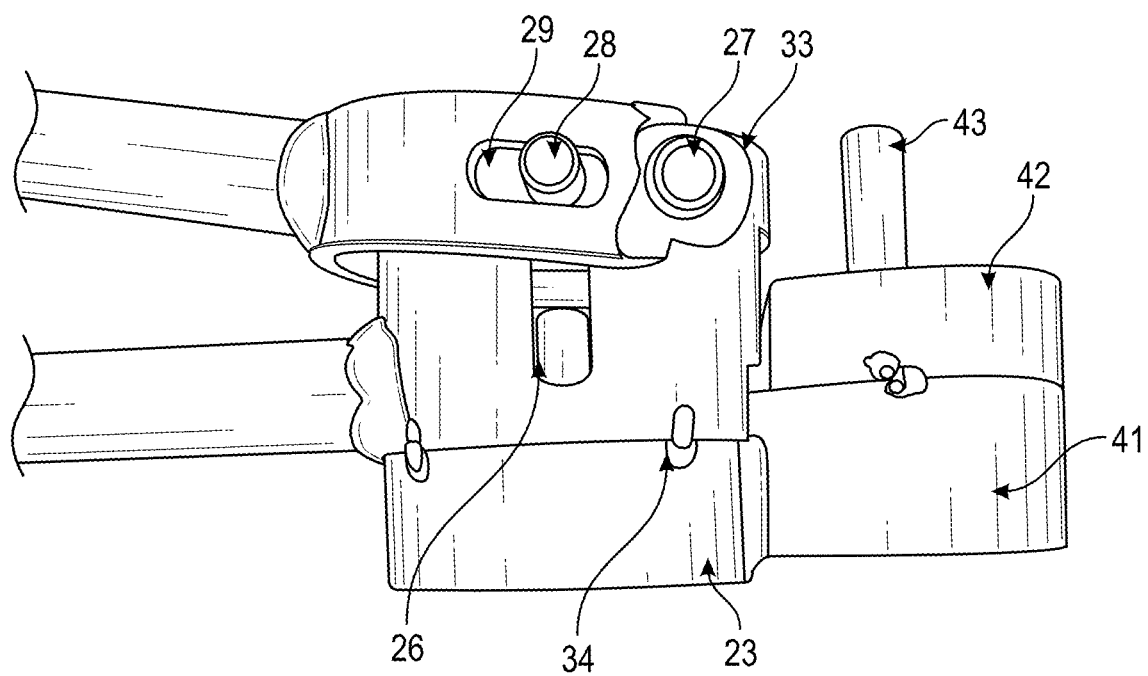
FIG. 3 is a close-up view of the embodiment of the invention.
Figure 4:
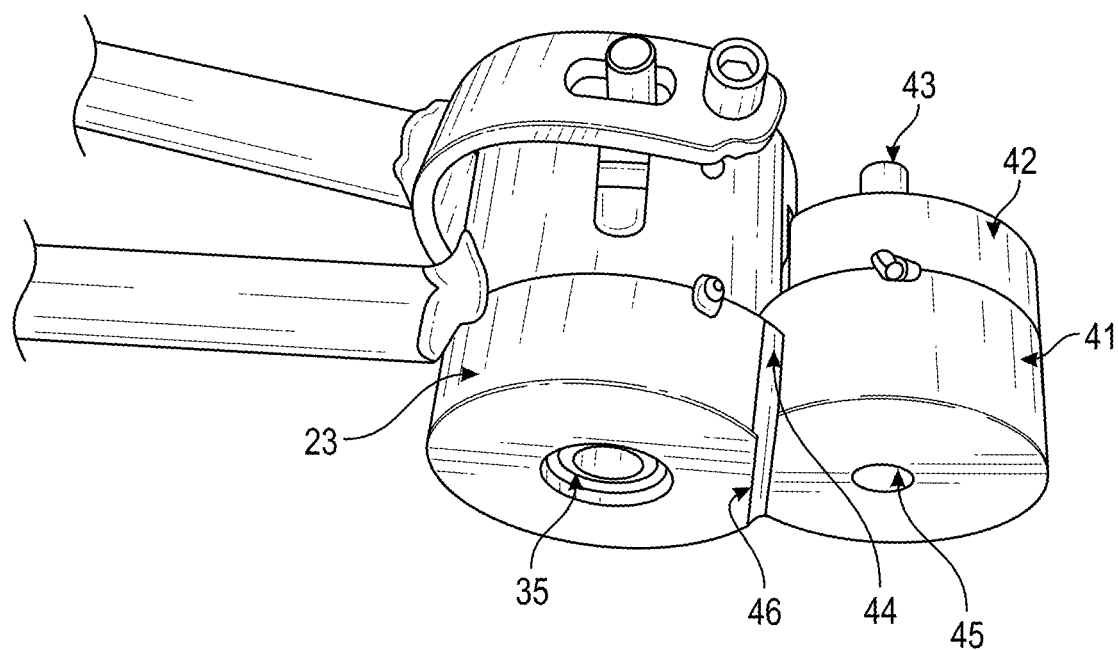
FIG. 4 is a lower perspective view of the embodiment of the invention.
Figure 5:
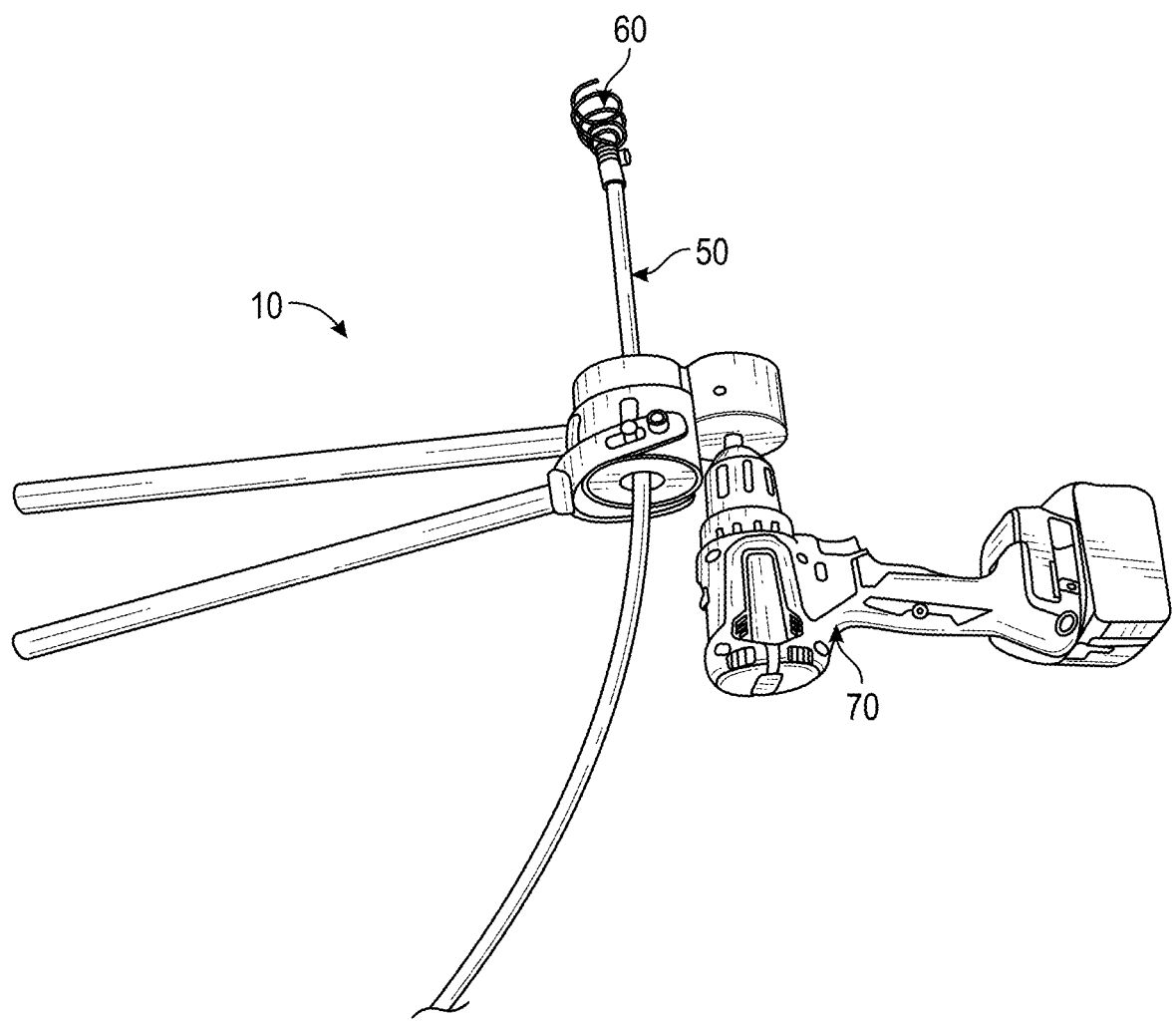
FIG. 5 is a view of the hand held drain cleaner coupled to a drill and a shaft.
Figure 6:
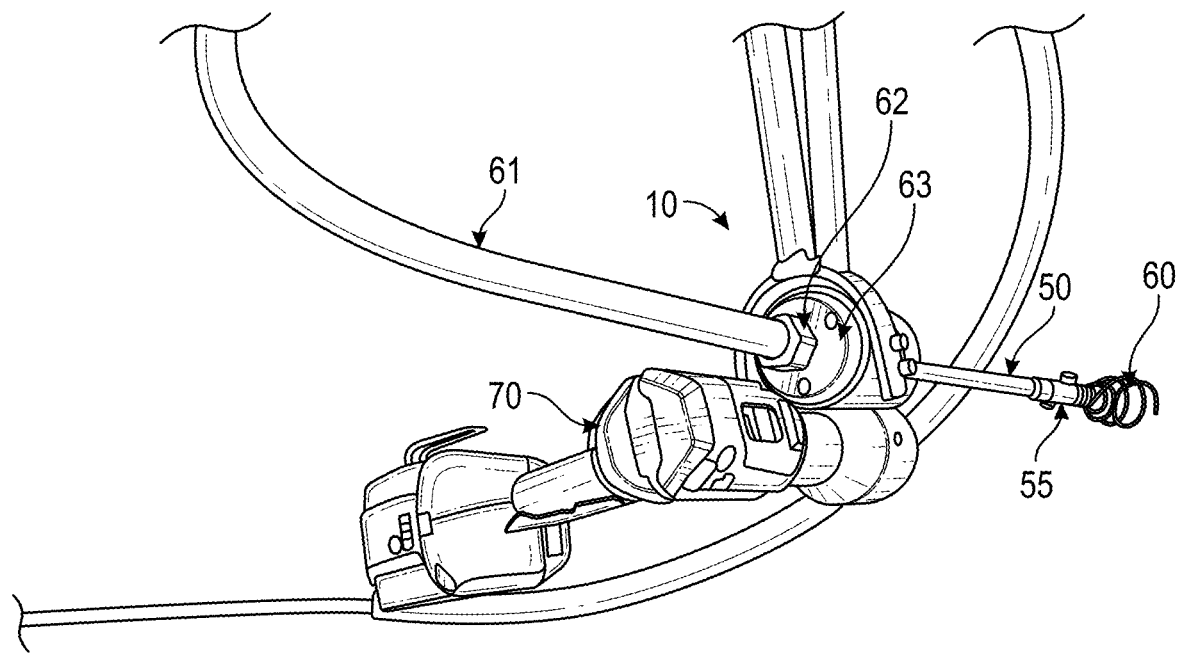
FIG. 6 is a view of the hand held drain cleaner with a conduit.
Figure 7:
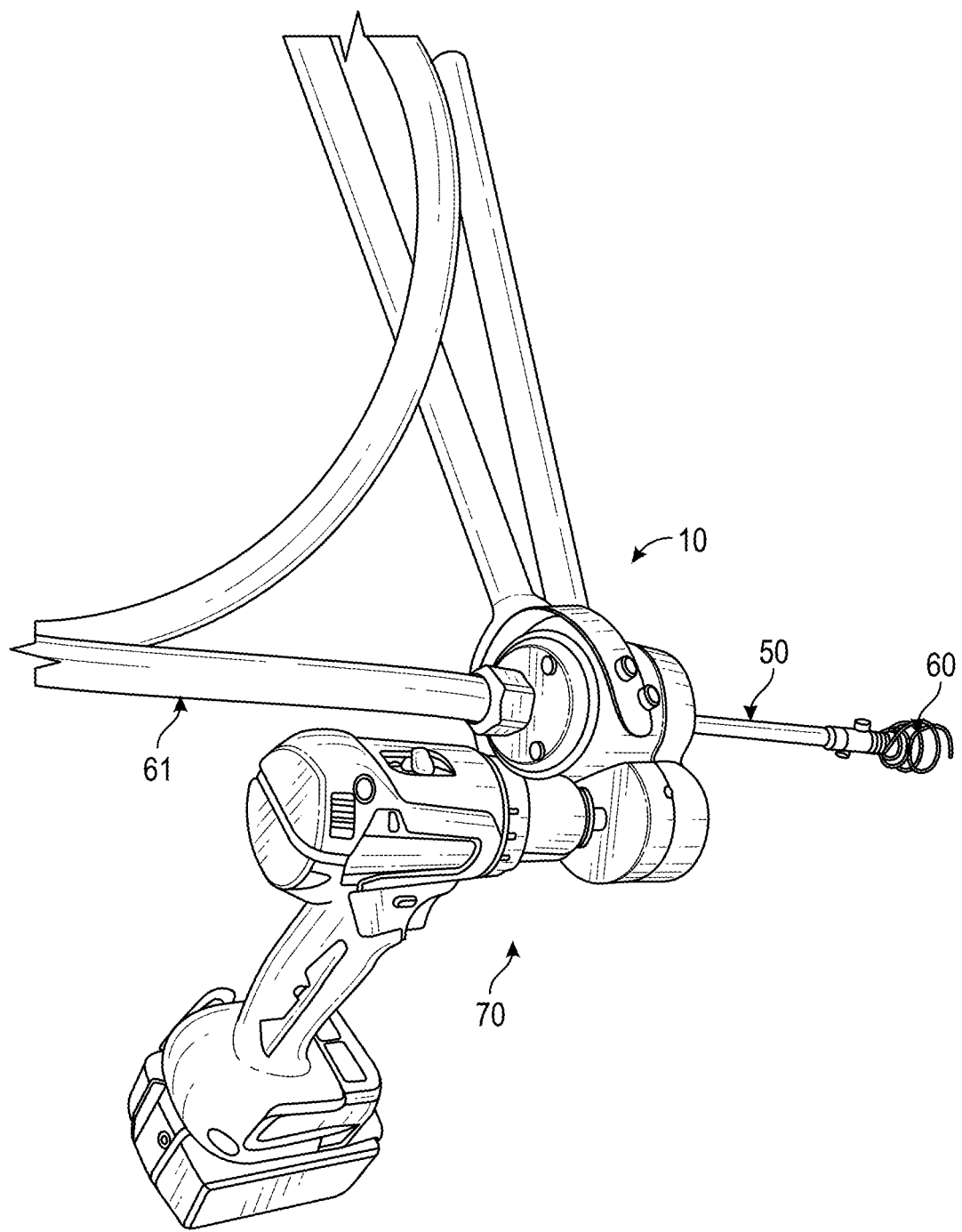
FIG. 7 is another view of the hand held drain cleaner with the conduit.
Figure 8:
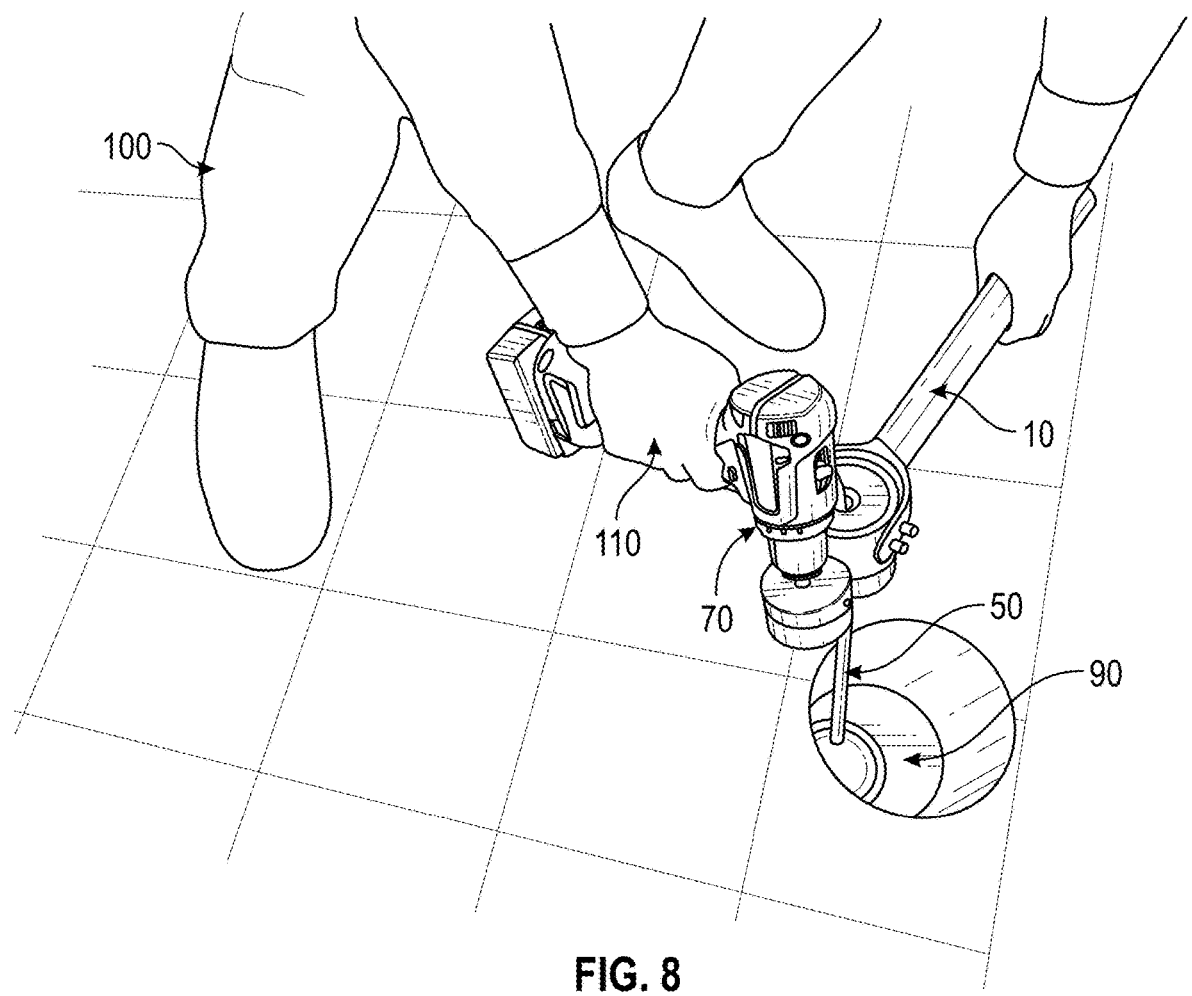
FIG. 8 is a view of the hand held drain cleaner when in use.

In this regard, FIG. 1 is an elevation view of an embodiment of the invention, FIG. 2 is an upper perspective view of the embodiment of the invention, FIG. 3 is a close-up view of the embodiment of the invention, and FIG. 4 is a lower perspective view of the embodiment of the invention.

Referring to FIGS. 1-4, a hand held drain cleaner 1 can include a body 10 having a first section 20 and a second section 40. The first section 20 is adjacent to the second section 40, and the first section 20 is coupled to the second section 40. In embodiments of the invention, the first section 20 and the second section 40 can be welded together at outer surfaces thereof, but such is not required, and the first section 20 and the second section 40 can be attached to each other by a fastening means such as a rivet, a nut and bolt combination, a screw, or by fitting pieces thereof together, but not limited thereto.

The first section 20 can include a lower part 22 connected to a lower handle 25 and an upper part 21 connected to an upper handle 24. The upper part 21 can move relative to the lower part 22 based on movement of the upper handle 24 with respect to the lower handle 25 when the upper and lower handles 24, 25 are squeezed together or released by a user 100 per FIG. 8. The upper handle 24 is coupled to the upper part 21 by a lever that can close or release the upper part 21 relative to the lower part 22. The upper part 21 and the lower part 22 can be movably coupled by a hinge 33.

Referring to FIGS. 1 and 2, the first section 20 further includes a housing including a first upper housing 32 and a first lower housing 23. The first upper housing 32 and the first lower housing 23 can be coupled to each other, and means of the coupling thereof can include welding, use of a rivet, by a nut and bolt combination, use of a screw, or fitting the pieces thereof together, but not limited thereto.

In an embodiment of the invention, the first section 20 can generally be a cylindrical shape, so that the first upper housing 32 and the first lower housing 23 can also have the cylindrical shape, respectively. However, the shape of the first section 20, the first upper housing 32, and the lower housing 23 can vary, so that rectangular shapes, an oval shape, polygonal shape and others are within the scope of this invention. In various embodiments, the shapes of the first upper housing 32 and the first lower housing 23 can be the same, or can be different from each other.

The upper part 21 can be formed in a semi-circular or semi-annular shape, and can partially encircle the first upper housing 32. The upper part 21 is coupled to the first upper housing 32. For example, a means for coupling the upper part 21 and the first upper housing 32 can be a first bolt 27 that is attached to the first upper housing 32 at a first end, and is attached to the upper part 21 at a second end. The upper part 21 is able to pivot relative to the first upper housing 32 at the hinge 33 that accommodates the first bolt 27. When the upper part 21 pivots, the upper handle 24 attached to the upper part 21 is able to move away or towards the lower handle 25.

The upper part 21 further includes an upper slot 29 (e.g., horizontal slot) at a location between an attachment point with the upper handle 24 and the hinge 33 (or the first bolt 27). The upper slot 29 includes room or space to accommodate a second bolt 28 that extends outward from the first upper housing 32. The second bolt 28 is connected to or attached to a collet 80 located inside the first section 20 (see FIG. 9). As the upper part 21 pivots relative to the first upper housing 32, the room or space in the upper slot 29 enables the second bolt 28 to move or slide across the upper slot 29, enabling the second bolt 28 to raise or lower the collet 80 relative to the first upper housing 32.

The first upper housing 32 further includes a lower slot 26 (e.g., vertical slot) at the lower part 22. The lower slot 26 is at a location of the lower part 22 between an attachment point with the lower handle 25 and an attachment point with the second section 40. The lower slot 26 exposes a side part of the collet 80 located inside the first section 20. The lower slot 26 also accommodates the second bolt 28 that extends outward from the first upper housing 32, and includes room or space so that the second bolt 28 is able to move or slide relative to the first housing upper housing 32 across the lower slot 26. Accordingly, when the upper part 21 pivots relative to the first upper housing 32, the second bolt 28 moves or slides across in both the upper slot 29 and the lower slot 26, and thereby raise or lower the collet 80 in the first upper housing 32. The lower slot 26 and the upper slot 29 are elongated in intersecting directions. In one example, the lower slot 26 and the upper slot 29 are elongated in perpendicular directions, and overlap.

The first lower housing 23 can be attached to the lower part 22, by means of a first connection 34. The first connection 34 can be a weld, but is not limited thereto, and other attaching means such as a rivet, a nut and bolt combination, a screw, or by fitting pieces thereof together, are within the scope of the present disclosure, but is not limited thereof.

Referring to FIG. 4, the first lower housing 23 can include a first lower hole 35 that can communicate with an interior space of the first upper housing 32. The first lower housing 23 also includes an interior space. A bottom surface of the first lower housing 23 is circular, and has the first lower hole 35 at a center of the bottom surface.

With reference to FIGS. 5-8, the drain cleaner 1 can be set up so that the body 10 is coupled to a drill 70, which is able to rotate the shaft 50 and the auger head 60 located at the end of the shaft 50 to clean a drain 90. A conduit 61 can accommodate the shaft 50 so that a user is protected from fluid, dirt and grime that can come into contact with the shaft 50 while the shaft 50 is in the drain. The conduit 61 can be connected to the body 10 via a conduit connector 62 and a conduit receiver 63.

With reference to FIGS. 1-4 and 9, the first lower housing 23 accommodates a first rotating gear 38 coupled to a first bearing 36. The first bearing 36 includes a first center hole 37 that communicates with the first lower hole 35. The collet 80 is also accommodated in the interior space of the first upper housing 32. Also, a collet head 84 can be partially inserted into the first center hole 37.

Figure 9:
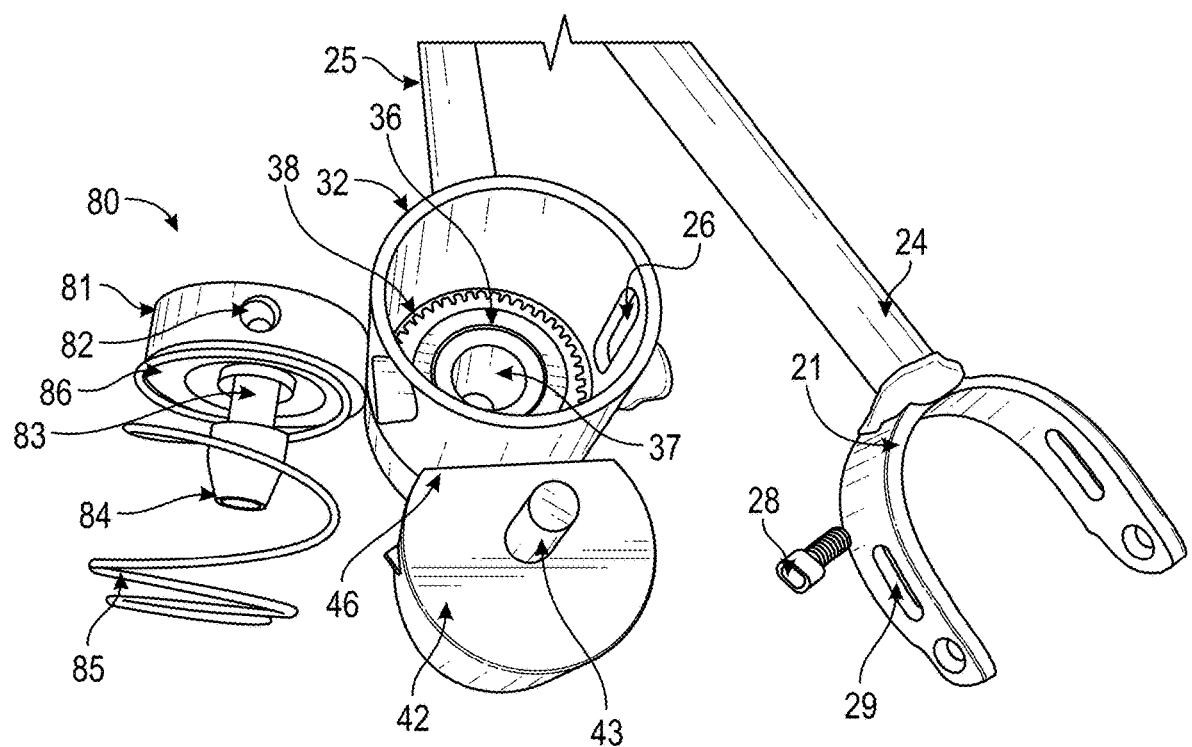
FIG. 9 is an exploded view of the embodiment of the invention.
Figure 10:
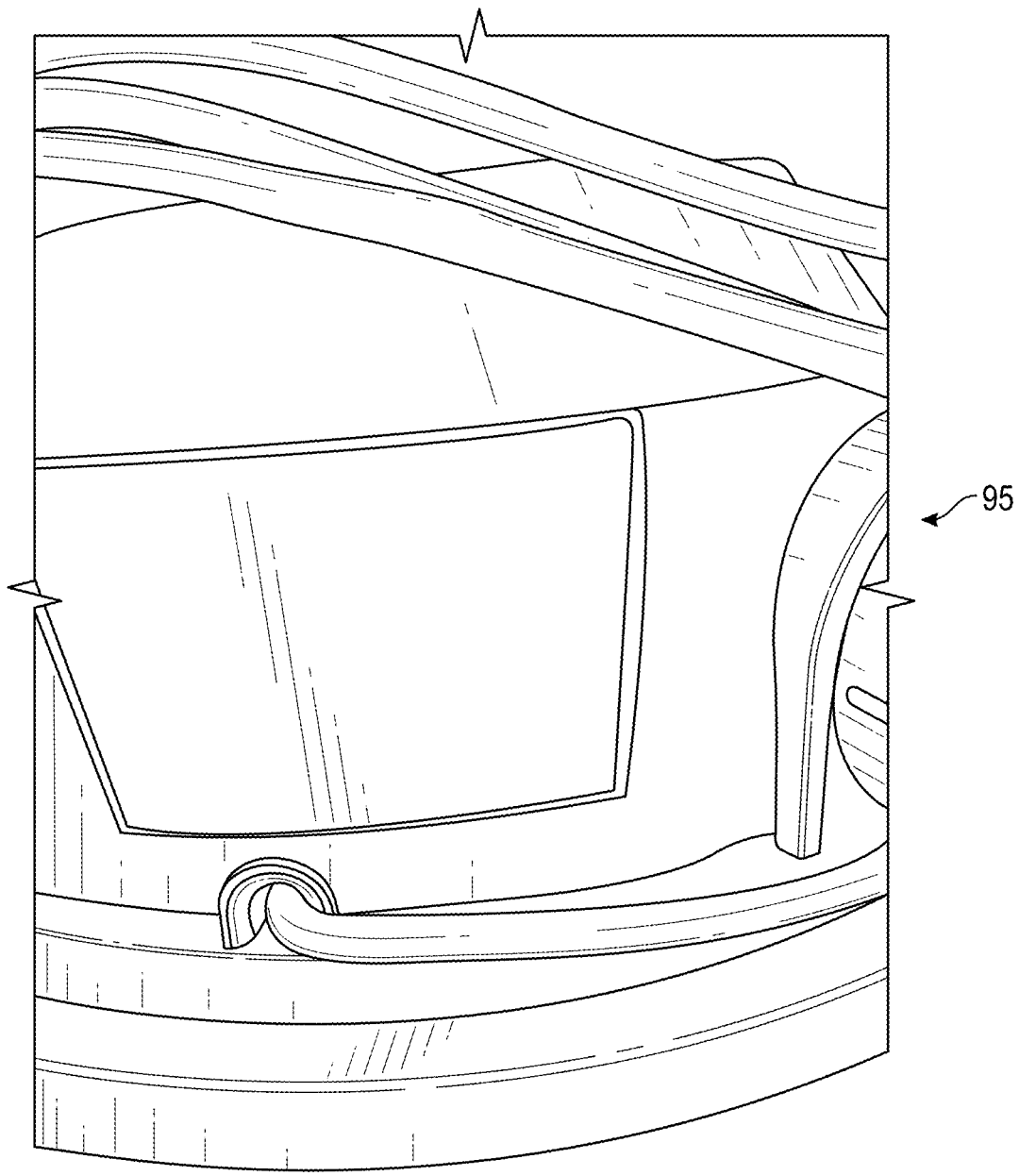
FIG. 10 is a view of a vacuum that can be used with the embodiment of the invention.
Figure 11:
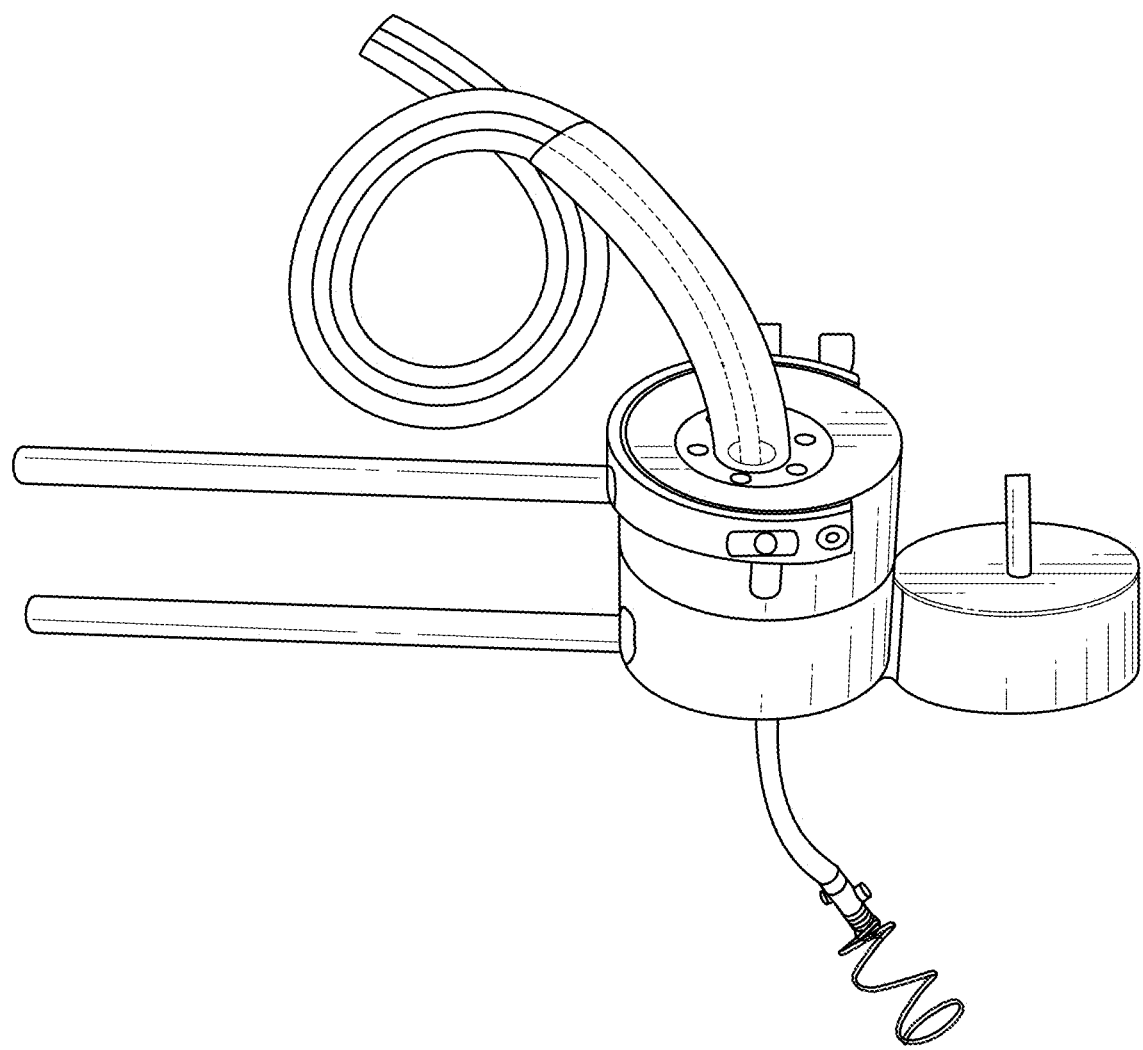
FIG. 11 is a drawing of an embodiment of the invention.
Figure 12:
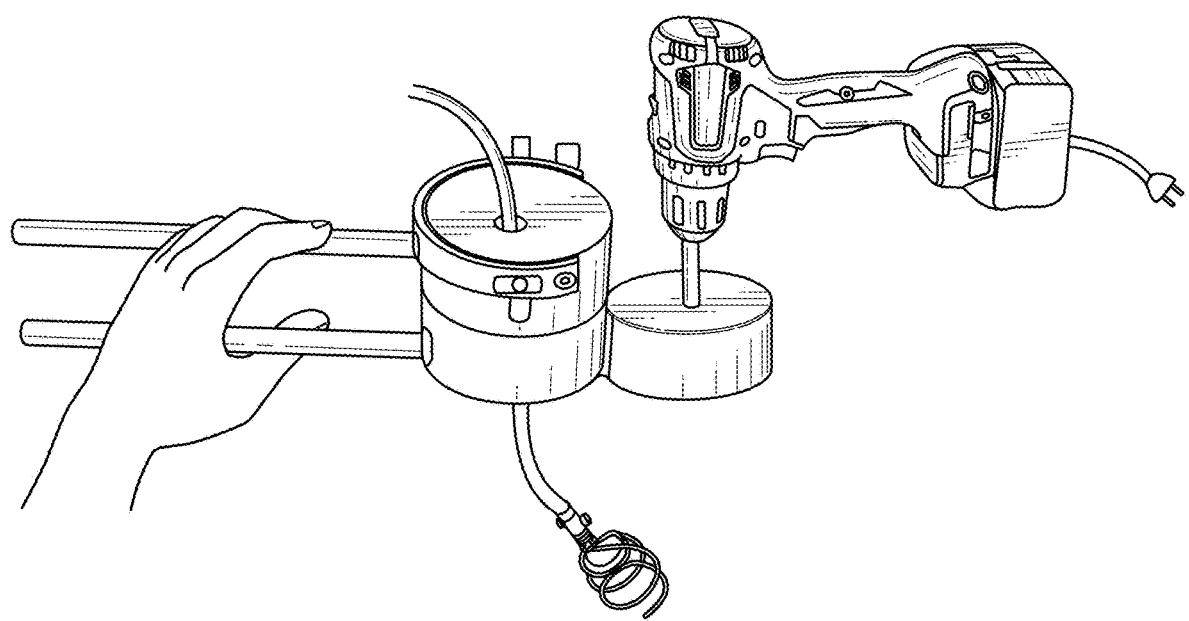
FIG. 12 is a drawing of the embodiment of the invention when in use.

With reference to FIG. 9, provided inside the first section 20 is a first rotating gear 38. The first rotating gear 38 can be supported by a first bearing 36. The upper part 21 can include a collet part 30 that includes a collet 80 that can have a shape (such as conical, but can also be cylindrical, or other polygonal shape, such as hexagonal) with slits or cuts that enable parted walls (collect head) 84 of the collect 80 to squeeze or catch a shaft 50 when the collet 80 is forced against an inner wall of a first center hole 37 of the first rotating gear 38 or the lower part 22 by movement of the handles 24, 25. An urging device 85, such as a spring can be provided in the first section 20 to interact with the collet part 30 in urging the collet 80 to disengage from the first center hole 37 of the first rotating gear 38 or the lower part 22. The collet part 30 can have an upper surface that is planar, and aligned with an upper edge of the first upper housing 32.

With reference to FIG. 9 and FIGS. 13-15, the collet 80 can include a collet body 81, a collect notch 82 located on the collet body 81, a collet shaft 83 connected to the connect body 81, a collet head 84 and a collect surface 801 or a recess 86 located on one side of the collet body 81. The urging device 85 can also be provided with the collet 80.

The collet 80 can be placed in the interior space of the first upper housing 32, whereby the collet head 84 is located towards the first center hole 37 and the collet body 81 is located towards first upper hole 31. The collet body 81 can be a circular disk that is able to rotate in the interior space of the first upper housing 32. The collet shaft 83 can be a cylinder having an interior hole that is connected to the collet body 81, and the collet head 84 can be a partial cone having an interior hole that is also connected to the collet shaft 83. The interior holes of the collet head 84, the collet shaft 83 and the collet body 81 communicate with each other in an axial direction to provide an interior path connecting an end of the collet head 84 to an end of the collet body 81.

The collet head 84 can be a partial cone or a truncated cone having a varying profile from a first end to a second end of the collet head 84 in an axial direction of the collet head 84. The first end of the collet head 84 is narrower than the second end of the collet head 84, and the first end of the collect head 84 is able to be coupled to the first center hole 37 of the first bearing 36. In various embodiments of the present disclosure, the first end of the collet head 84 can be inserted into the first center hole 37 to squeeze together portions of the first end of the collet head 84, which narrows an opening of the interior hole of the collet head 84 at the first end.

The urging device 85 can have a first end to contact the first bearing 36 and a second end to contact the collet body 81 at the collet recess 86 or the collet groove 87. When the collet 80 is urged towards the first bearing 36, the urging device 85 can be pushed or pressed so that spacing between coils of the urging device 85 becomes narrower. When pressure on the collet 80 is released, the urging device 85 springs back to push the collet 80 away from the first bearing 36, and the spacing between the coils of the urging device 85 becomes wider.

With reference to FIG. 9, the collet notch 82 receives the second bolt 28, and a movement of the upper handle 24 transfers to the collet 80 through the second bolt 28 to provide the pressure that pushes the collet 80 towards the first bearing 36. Meanwhile, releasing pressure by the upper handle 24 allows the urging device 85 to transfer the movement away from the first bearing 36 to the upper handle 24 through the second bolt 28.

The shaft 50 can be flexible. The collet 80 and the shaft 50 can be rotated. The shaft 50 can be fed through a passage comprising a first upper hole 31 in the middle of the first section 20, such as the first rotating gear 38 and the collet 80, and can be held when the handle 24, 25 is squeezed, but the shaft 50 can be released when the handle 24, 25 is released so that a length of the shaft 50 used to clean the drain can be adjusted. The shaft 50 can be connected to an auger head 60 by a connector 55.

With reference to FIGS. 1-4 and 9, the second section 40 includes a housing that includes a second lower housing 41 and a second upper housing 42 that contains a second rotating gear 48, and has a center shaft 43 that extends outward. The center shaft 43 can be coupled to a drill 70 that can rotate the second rotating gear 48 connected to the center shaft 43. The second rotating gear 48 communicates with the first rotating gear 38 so that the rotation of the drill 70 is transferred to the first rotating gear 38 via the second rotating gear 48. The speed of rotation of the shaft 50 can be controlled by the speed of rotation of the drill 70.

The second lower housing 41 can be attached to the first lower housing 23 at a second connection 44, and enable the second rotating gear 48 to communicate with the first rotating gear 38. At the second connection 44, a second cut 46 can be formed on a sidewall of the second lower housing 41 that enables a portion of the second rotating gear 48 to protrude out of the second lower housing 41. When the second lower housing 41 is coupled to the first lower housing 23, the portion of the second rotating gear 48 is able to extend through a hole at the second cut 46 to partly enter the interior space in the first lower housing 23, and teeth of the second rotating gear 48 can intermesh with teeth of the first rotating gear 38.

The drain cleaner 1 can be held by one hand 110 of the user 100 and the drill 70 can be held by another hand 110 of the user 100 to give the drain cleaner 1 stability and case of use.

A conduit 61 can enclose a portion of the shaft 50 that is away from the drain cleaner 1 to protect the user 100, and to maintain cleanliness.

A vacuum 95 can be used with the drain cleaner 1, and can be connected to the conduit 61 to remove debris or suck-up debris.

Figure 13:
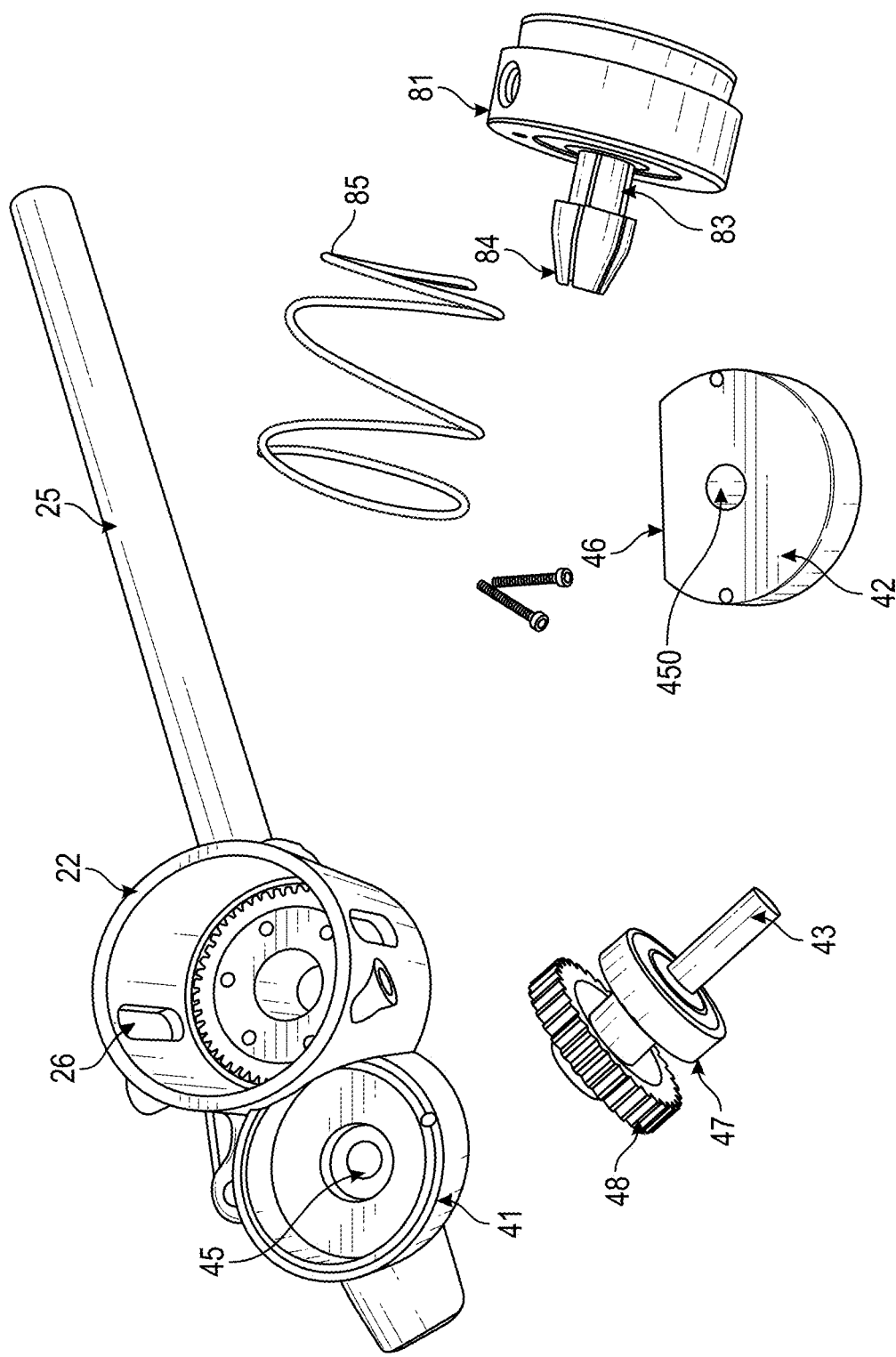
FIG. 13 is an exploded view of the embodiment of the invention.

FIG. 13 shows the details of the second lower housing 41, the lower part 22, and the lower handle 25. Also shown are details of elements located in the interior space of the second lower housing 41 and the lower part 22.

For example, the second rotating gear 48 is connected to a second bearing 47. A center shaft 43 is directly connected to the second rotating gear 48, so that a rotation imparted on the center shaft 43 also rotates the second rotating gear 48. The second bearing 47 supports the rotation of the center shaft 43 and the second rotating gear 48. A second holder 49 at a bottom portion of the second rotating gear 48 can be placed on a recess of the second lower housing 41 that communicates with the second lower hole 45. Also, when the second rotating gear 48 is placed in the interior space of the second lower housing 41, the second upper housing 42 can cover the interior space of the second lower housing 41. The second upper housing 42 includes a second upper hole 450 that communicates with the interior space of the second lower housing 41. The second upper hole enables the center shaft 43 to penetrate through the second upper housing 42.

The second upper housing 42 and the second lower housing 41 can be joined and fitted to form the second section 40. The second upper housing 42 and the second lower housing 41 can be joined by a fastener. In one or more embodiments of the present disclosure, the fastener can be screws that penetrate through the second upper housing 42 and connect to the second lower housing 41, but such is not required, and the second upper housing 42 can be connected to the second lower housing 41 by welding, such as by a third connection. Nevertheless, use of a fastener such as screws enables the second upper housing 42 and the second lower housing 41 to be separated to access the second rotating gear 48 for servicing or replacement, as an example.

Figure 14:
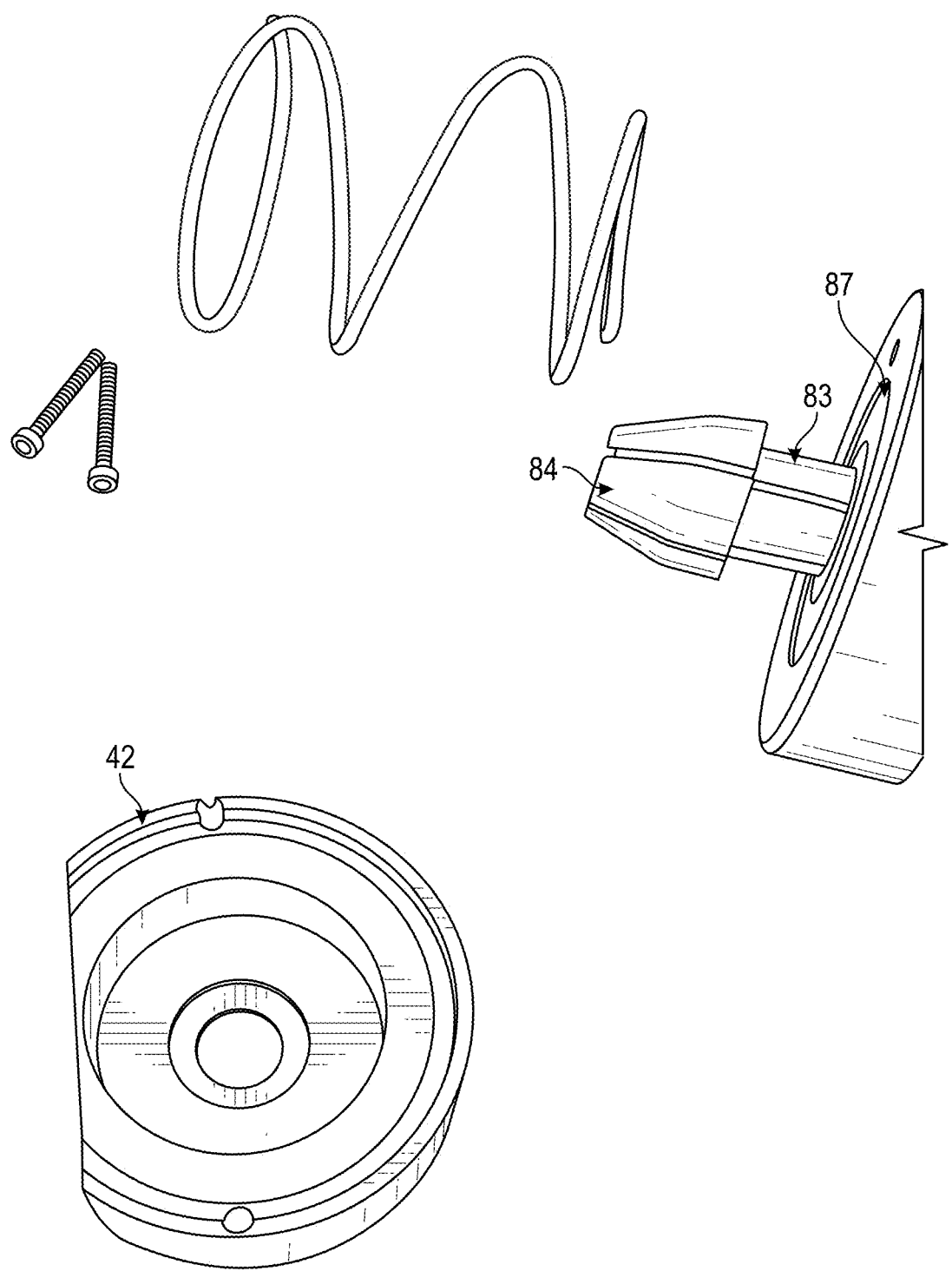
FIG. 14 is a drawing of details of the collet and the second upper housing according to the embodiment of the invention.

With reference to FIG. 14, the collet head 84 can include a plurality of sections or parted walls that annularly define the inner hole of the collet head 84. The plurality of sections of the collet head 84 can include at least two or more sections, but embodiments of the present disclosure can include three sections, four sections or five sections, but is not limited thereto. The collet shaft 83 can also include a plurality of sections or parted walls that annularly define the inner hole of the collet shaft 83. In various embodiments of the present disclosure, the number of sections of the collet head 84 can be the same or different from the number of sections of the collet shaft 83. In various embodiments of the present disclosure, each section of the collet head 84 can connect to each section of the collet shaft 83, respectively.

Between the plurality of sections of the collet head 84 and the collet shaft 83 are cuts that can extend from the first end of the collet head 84 to the collet shaft 83. Each section of the collet head 84 can be moved independently. When the first end of the collet head 84 is urged into the first center hole 37 of the first bearing 36, the plurality of sections of the collet head 84 are squeezed together to constrict a size of the opening at the first end of the collet head 84 to impinge on the shaft 50 that extends through the inner holes of the collet head 84, the collet shaft 83 and the collet body 81. In embodiments of the present disclosure, when the collet head 84 is inserted more into the first center hole 37, the plurality of sections of the collet head 84 can be squeezed together more based on the cone shape of the collet head 84 at the first end. When the collet head 84 is squeezed together with greater force, a greater amount of force can be applied to the outer surface of shaft 50 to ensure that the shaft 50 is cinched by the parted walls of the collet head 84 and rotated together with the rotation of the first rotating gear 38. The collet head 84 can be squeezed together with greater force by applying greater squeezing force to the upper handle 24 and the lower handle 25.

Figure 15:
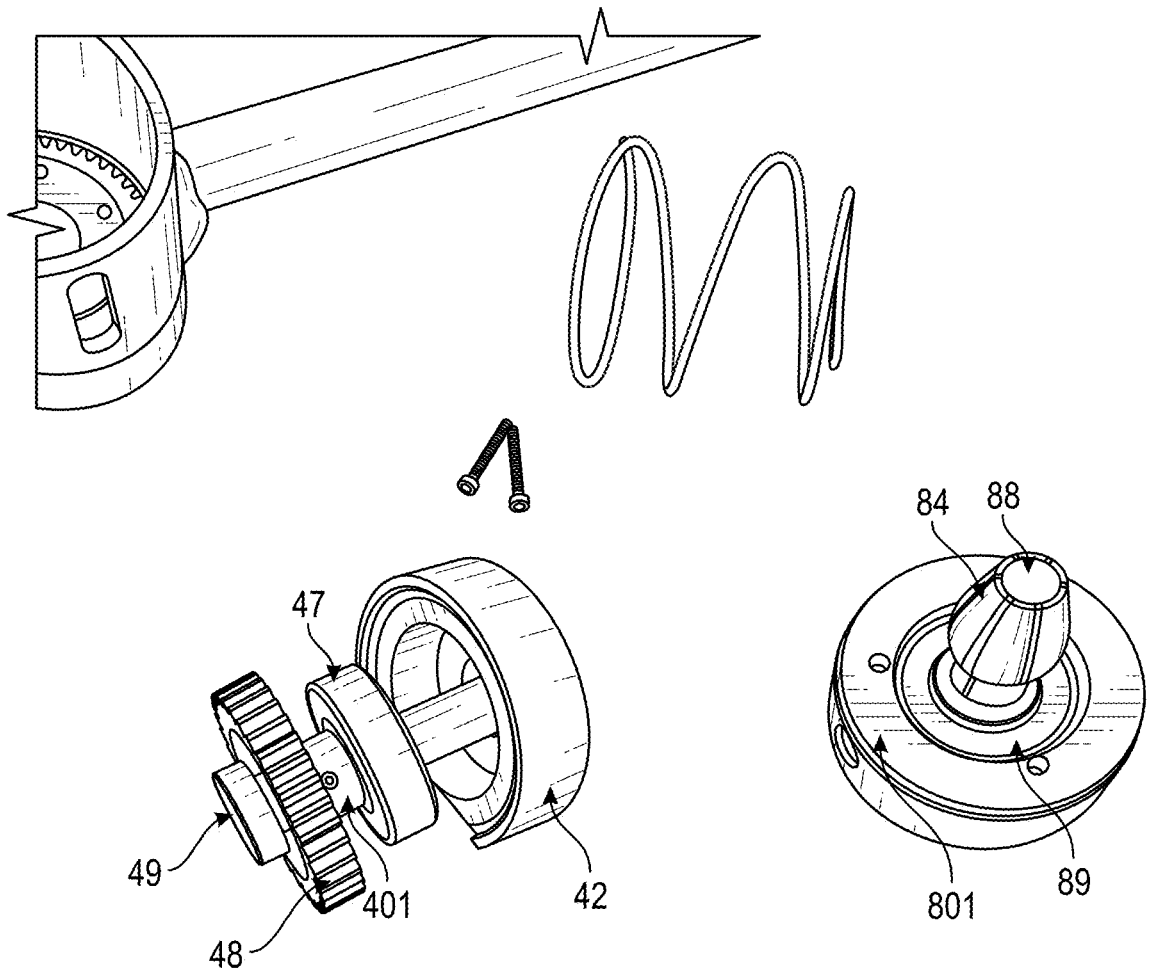
FIG. 15 is a drawing of details of another view of the collet and an exploded view of the second upper housing and a bearing structure according to the embodiments of the invention.

With reference to FIG. 15, the second rotating gear 48 can be connected to the second holder 49 at one side, and connected to the second holder 401 at another side. The second bearing 47 can be connected to the second holder 401. Each of the second holder 49, the second rotating gear 48, the second holder 401 and the second bearing 47 can be attached to the center shaft 43, so that the second rotating gear 48 rotates with the rotation of the center shaft 43.

With reference to FIG. 15, the collet 80 includes the inner hole in the form of a collet passage 88 enclosed by the collet head 84, supported by a collet bearing 89 connected to the collet surface 801 of the collet body 81.

Figure 16:
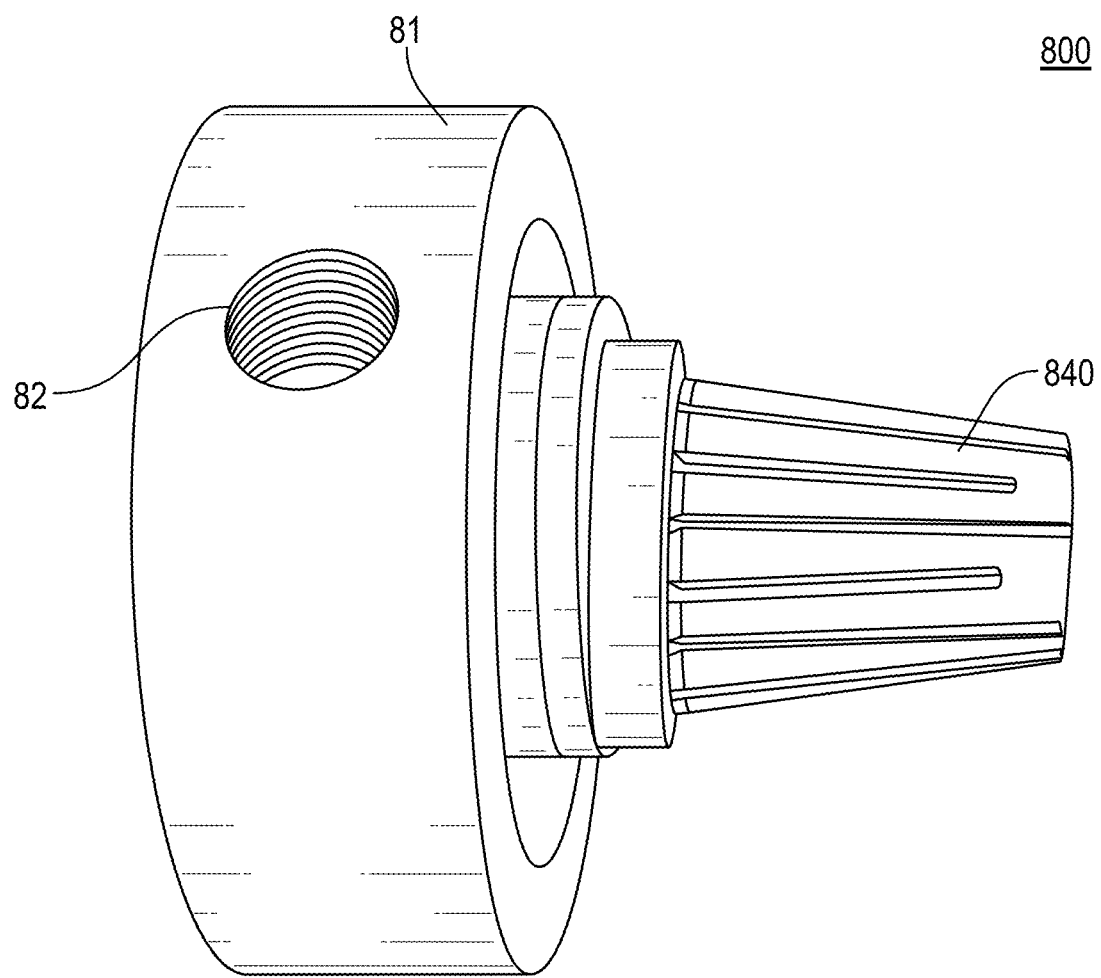
FIG. 16 is a profile view of a typical collet that can be used in the invention.
Figure 17:
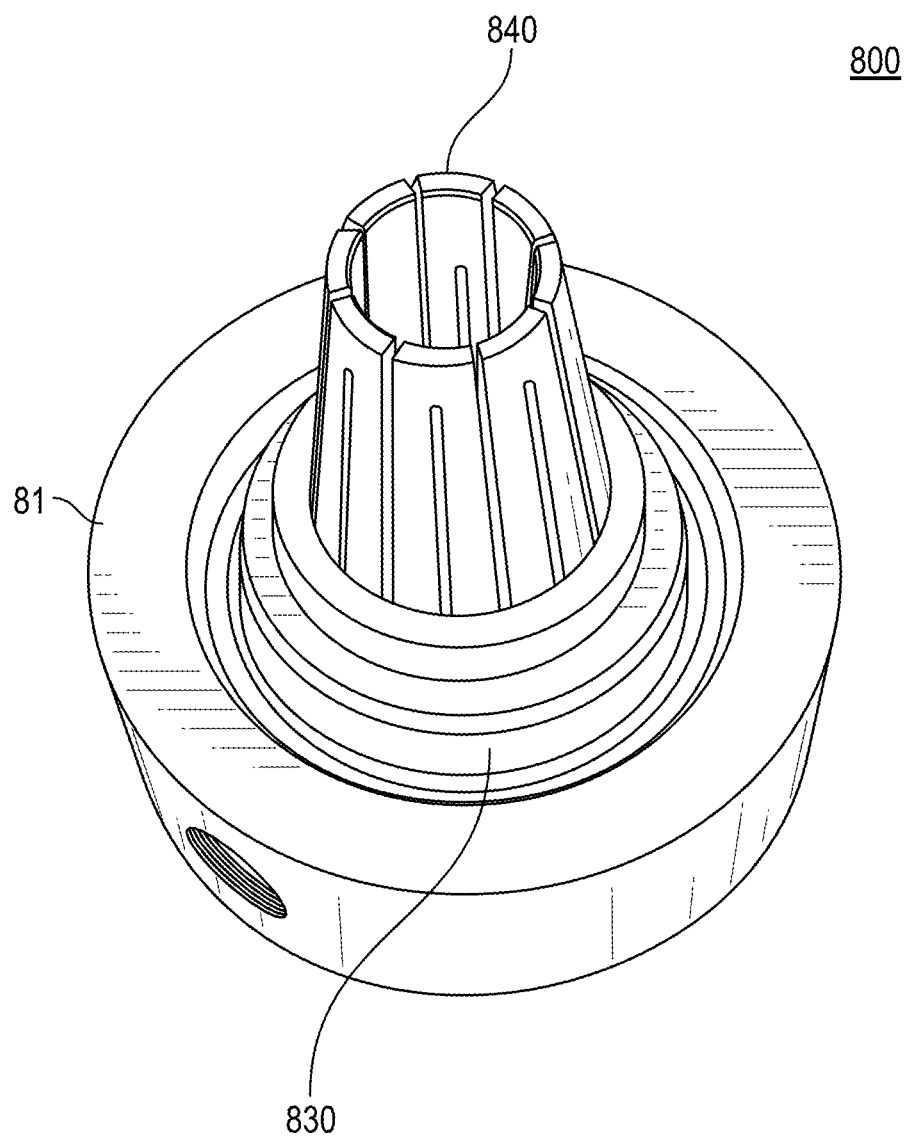
FIG. 17 is an upper perspective view of a typical collet that can be used in the invention.
Figure 18:
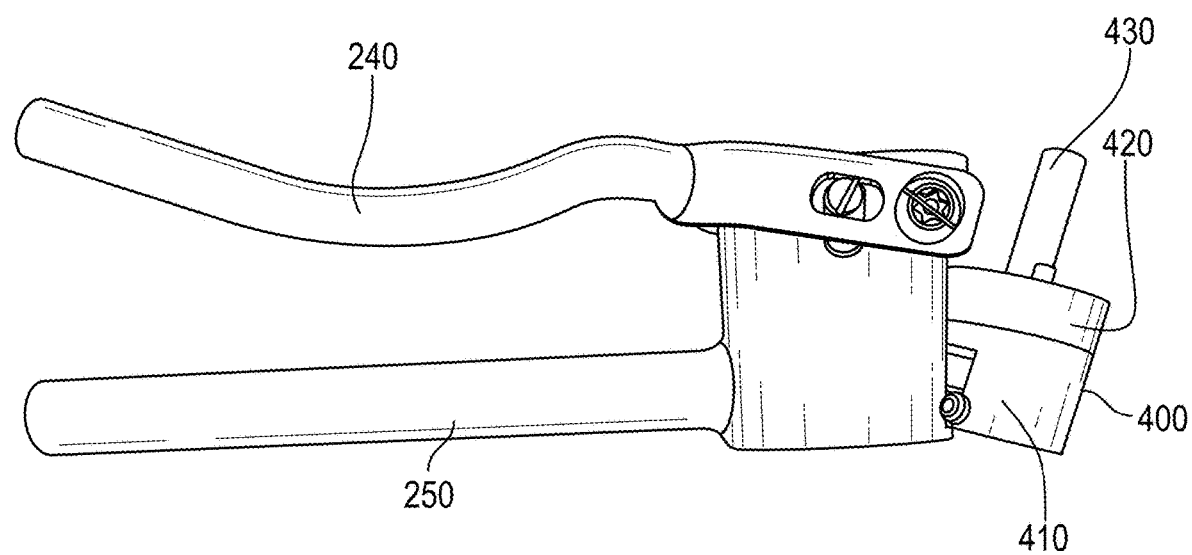
FIG. 18 is a drawing of another embodiment of the invention.

FIG. 16 is a collet according to another embodiment of the present disclosure. FIG. 17 shows details of the collet according to the another embodiment of the present disclosure of FIG. 16, and FIG. 18 shows a drain cleaner according to another embodiment of the present disclosure.

In FIG. 16, since configurations of a collet of FIG. 16 can be substantially identical to the collet in FIGS. 9 and 13-15 with only differences in configurations of the collet head and one or more patterns of the separations walls, redundant descriptions will be omitted. The same reference numerals will be used for the same components. Hereinafter, a description of the same reference numerals can be made with reference to FIGS. 9 and 13-15.

With reference to FIG. 16, the collet 800 includes a collet body 81 having a collet notch 82. The collet 800 also has a collet head 840 that can have a plurality of parted walls separated by primary cuts that extend from the collet body 81 towards a tip of the collet head 840 at a first end of the collet head 840. In addition, at least one parted wall further includes a secondary cut located in the middle of the at least one parted wall. Accordingly, the at least one parted wall can have two halves defined by the secondary cut, and the two halves can be connected at the first end of the collet head 840 that is distal from the collet body 81. But embodiments of the present disclosure are not limited thereto, and the at least one parted wall can have two or more secondary cuts, and multiple secondary sections or halves. Also, the connections of secondary sections of the at least one parted wall defined by the secondary cuts can be located near the first end of the collet head 840 or at a location away from the first end of the collet head 840 (e.g., near the collet body 81) or a combination thereof.

With reference to FIG. 17, the collet 800 of FIG. 16 is shown in further detail. The same reference numerals will be used for the same components. Referring to FIG. 17, the collet head 840 has the primary cuts and the secondary cuts that extend in a direction essentially parallel to an axial direction of the collet head 840. As shown in FIG. 17, the collet 800 does not need to have a collect shaft, or can have a collect shaft that is short. In FIG. 17, the collet 800 includes a collet base 830 that connects the collet head 840 to the collet body 81. Due to a compact size of the collet base 830, the collet head 840 can be more immediately connected to the collet body 81, and can provide stronger support for the collet head 840 to the collet body 81. Meanwhile, the primary and secondary cuts in the parted walls of the collet head 840 provide flexibility to the collet head 840 to better grip the shaft 50. Meanwhile, although the primary cuts and the secondary cuts are shown as essentially parallel to the axial direction of the collet head 840, embodiments of the present disclosure are not limited thereto, and at least one of primary cuts and the secondary cuts can extend in a different direction to the axial direction, such as in a perpendicular direction, angular direction, an intersecting direction, or others.

In FIG. 18, since configurations of the drain cleaner of FIG. 18 can be substantially identical to the drain cleaner in FIGS. 1-4, with only differences in configurations of the upper handle 240, and the second section 400, redundant descriptions will be omitted. The same reference numerals will be used for the same components. Hereinafter, a description of the same reference numerals can be made with reference to FIGS. 1-4.

Referring to FIG. 18, the upper handle 240 can be formed in a curve that can be ergonomic, provide easier grip, or formed angled to provide more gripping power with less application of strength. The curve in the upper handle 240 can provide a shorter squeeze distance between the upper handle 240 and the lower handle 250. Also, the location of the curve can be set to provide a predetermined angular momentum to the drain cleaner to provide a predetermined force to the collet head (e.g., 84, 840) to grip the shaft 50.

In addition, the second section 400 can be coupled to the first section 20 at an angle different from the parallel configuration of FIG. 1, for example, so that the drill 70 can be attached to the center shaft 430 of the second section 400 at an angle, such as a more ergonomic angle that enables better application of arm strength, and also provides gripping comfort.

By using two points of contact with the user 100 via the upper and lower handles, and the center shaft, the user 100 can push the drain cleaner 1 away with more force, and also allow the drain cleaner 1 to be pulled toward the user 100 with greater case.

Although the example embodiments of the present disclosure have been described in detail with reference to the accompanying drawings, the present disclosure is not limited thereto and can be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

DESCRIPTION OF THE SYMBOLS

1: Drain cleaner
10: Body
20: First Section
21: Upper part
22: Lower part
23: First lower housing
24: Upper handle
25: Lower handle
26: Lower slot
27: First bolt
28: Second bolt
29: Upper slot
240: Upper handle
250: Lower handle
30: Collet Part
31: First upper hole
32: First upper housing
33: Hinge
34: First connection
35: First lower hole
36: First bearing
37: First center hole
38: First rotating gear
40. Second Section
41: Second lower housing
42: Second upper housing
43: Center shaft
44: Second housing
45: Second upper hole
46: Second cut
47: Second bearing
48: Second rotating gear
49: Second Holder
400: Second Section
401: Second Support
410: Second lower housing
420: Second upper housing
430: Center shaft
50: Shaft 55: Connector
60: Auger head
61: Conduit
62: Conduit connector
63: Conduit receiver
70: Drill
80: Collet
81: Collet body
82: Collet notch
83: Collet shaft
84: Collet head
85: Urging device
86: Collet recess
87: Collet groove
88: Collet passage
89: Collet bearing
800: Collet
801: Collet surface
830 Collet base
840: Collet head
90: Drain
95: Vacuum
100: User
110: Hand of user

What is claimed is:

1. A drain cleaner comprising:
a body having a first section and a second section connected to the first section;
a first rotating member rotatably disposed in an interior of the first section;
a collet rotatably disposed in the interior of the first section, and configured to grab a shaft that penetrates through the first section;
a second rotating member rotatably disposed in an interior of the second section, and communicating with the first rotating member; and
a handle part connected to the first section, and configured to enable a user to hold the handle part,
wherein the first section and the second section are arranged side-by-side in radial directions of the first section and the second section, and the first section and the second section are connected to each other at respective outer circumferential surfaces in the radial directions of the first section and the second section,
wherein the collet includes:
a collet body; and
a collet head connected to the collet body,
wherein a hole extends through the collet body and the collet head to accommodate the shaft, and
wherein the drain cleaner further comprises an urging device interposed between the first rotating member and the collet body to push on the collet body.

2. The drain cleaner of claim 1, wherein the first section includes:
an upper part;
a first upper housing adjacent to the upper part;
a first lower housing; and
a lower part interposed between the first upper housing and the first lower housing and coupled to the first upper housing and the first lower housing, and
wherein the handle part includes:
an upper handle connected to the upper part; and
a lower handle connected to at least one of the lower part and the first lower housing.

3. The drain cleaner of claim 2, wherein the upper part is connected to the upper housing by a hinge to pivot relative to the upper housing.

4. The drain cleaner of claim 2, wherein the upper part includes an upper slot,
wherein the lower part includes a lower slot, and
wherein a rod is connected to the collet and penetrates through the upper slot and the lower slot to slidably move in the upper slot and the lower slot based on a movement of the upper handle.

5. The drain cleaner of claim 1, wherein the collet head includes a first end distal from the collet body and a second end proximal to the collet body, and wherein the collet head is in a shape of a truncated cone.

6. The drain cleaner of claim 2, wherein the collet head further includes cuts extending in an axial direction of the hole.

7. The drain cleaner of claim 6, wherein the cuts include a plurality of primary cuts extending along the collet head, and a plurality of secondary cuts extending between the plurality of primary cuts.

8. The drain cleaner of claim 1, wherein the first rotating member includes a hole having an inner wall, and
wherein the collet head is configured to be inserted into the hole of the first rotating member so that the first rotating member and the collet head rotate together when the handle part is squeezed by the user.

9. The drain clear of claim 1, wherein the collect body includes:
a collet notch; and
a rod connected to the collet notch to enable the collet to engage the first rotating member.

10. The drain cleaner of claim 1, wherein the first rotating member includes:
a first bearing connected to the first section;
a first rotating gear connected to the first bearing; and
a first center hole, and
wherein the first bearing, the first rotating gear and the first center hole are aligned in an axial direction.

11. The drain cleaner of claim 1, wherein the second section includes:
a second upper housing; and
a second lower housing coupled to the second upper housing, and
wherein the second upper housing and the second lower housing defines the interior of the second section.

12. The drain cleaner of claim 11, wherein the second rotating member includes:
a second bearing connected to the second lower housing;
a second rotating gear connected to the second bearing; and
a center shaft connected to the second bearing and the second rotating gear, and
wherein the center shaft, the second bearing and the second rotating gear are aligned in an axial direction.

13. The drain cleaner of claim 1, wherein a first rotation axis of the first rotating member and a second rotation axis of the second rotating member are one of parallel or angled to each other.

14. The drain cleaner of claim 1, wherein the handle part includes:
an upper handle connected to an upper part of the first section; and
a lower handle connected to at least one of a lower part and a first lower housing of the first section, and
wherein the upper handle is one of straight or curved.

15. The drain cleaner of claim 1, wherein the drain cleaner is configured to enable the user to hold the handle part using a first hand and a drill connected to the second rotating member using a second hand, and enable the user to push the drain cleaner away from the user or pull the drain cleaner towards the user.

16. A drain cleaner comprising:
a first section accommodating a first rotating member and a collet configured to rotate with the first rotating member when engaged to the first rotating member; and
a second section connected to the first section and accommodating a second rotating member configured to engage a drill,
wherein a rotation of the drill rotates the second rotating member, the first rotating member, and the collet,
wherein the collet includes:
a collet body; and
a collet head connected to the collet body,
wherein a hole extends through the collet body and the collet head to accommodate the shaft, and
wherein the drain cleaner further comprises an urging device interposed between the first rotating member and the collet body to push on the collet body.

17. The drain cleaner of claim 16, further comprising a shaft extending through the first section, and configured to rotate based on the rotation of the drill.

18. The drain cleaner of claim 16, wherein the first rotating member includes:
a first bearing connected to the first section;
a first rotating gear connected to the first bearing; and
a first center hole, and
wherein the first bearing, the first rotating gear and the first center hole are aligned in an axial direction.

19. A drain cleaner comprising:
a body having a first section and a second section connected to the first section;
a first rotating member rotatably disposed in an interior of the first section;
a collet rotatably disposed in the interior of the first section, and configured to grab a shaft that penetrates through the first section;
a second rotating member rotatably disposed in an interior of the second section, and communicating with the first rotating member; and
a handle part connected to the first section, and configured to enable a user to hold the handle part,
wherein the first section and the second section are arranged side-by-side in radial directions of the first section and the second section, and the first section and the second section are connected to each other at respective outer circumferential surfaces in the radial directions of the first section and the second section,
wherein the collet includes:
a collet body; and
a collet head connected to the collet body,
wherein a hole extends through the collet body and the collet head to accommodate the shaft, and
wherein the collect body includes:
a collet notch; and
a rod connected to the collet notch to enable the collet to engage the first rotating member.

* * * * *